(12) United States Patent
Salonia et al.

(10) Patent No.: US 7,011,324 B2
(45) Date of Patent: Mar. 14, 2006

(54) BICYCLE STEERING DISK BRAKE AND STABILIZER

(76) Inventors: James Philip Salonia, RR1, 209S, Colebrook, NH (US) 03576; Philip James Salonia, P.O. Box 163, Errol, NH (US) 03579

( * ) Notice: Subject to any disclaimer, the term of this patent is extended or adjusted under 35 U.S.C. 154(b) by 42 days.

(21) Appl. No.: 10/794,812

(22) Filed: Mar. 8, 2004

(65) Prior Publication Data

US 2005/0194760 A1    Sep. 8, 2005

(51) Int. Cl.
   *B62K 21/08* (2006.01)
(52) U.S. Cl. .................. 280/272; 280/264; 188/26
(58) Field of Classification Search ............. 280/263, 280/264, 270, 272, 279, 280; 188/26, 1.112
See application file for complete search history.

(56) References Cited

U.S. PATENT DOCUMENTS

| | | | | |
|---|---|---|---|---|
| 4,616,523 A | * | 10/1986 | Jones | 280/264 |
| 4,653,768 A | * | 3/1987 | Keys et al. | 280/279 |
| 4,753,448 A | * | 6/1988 | Nagashima | 280/264 |
| 4,770,435 A | * | 9/1988 | Cristie | 280/279 |
| 5,492,033 A | * | 2/1996 | Hopey | 280/272 |
| 5,516,133 A | * | 5/1996 | Motrenec et al. | 280/272 |
| 5,615,585 A | * | 4/1997 | Chi | 280/279 |
| 5,927,740 A | * | 7/1999 | Hopey | 280/272 |
| 5,992,869 A | * | 11/1999 | Yi-Chen | 280/264 |
| 6,224,079 B1 | * | 5/2001 | Goring | 280/279 |
| 6,422,353 B1 | * | 7/2002 | Lin | 188/24.11 |
| 6,523,847 B1 | * | 2/2003 | Chien | 280/279 |
| 6,799,772 B1 | * | 10/2004 | Kettler et al. | 280/272 |
| 6,802,519 B1 | * | 10/2004 | Morgan et al. | 280/272 |
| 6,817,265 B1 | * | 11/2004 | Hasegawa et al. | 280/272 |
| 6,824,153 B1 | * | 11/2004 | Hanawa et al. | 280/272 |
| 6,848,698 B1 | * | 2/2005 | Hasegawa et al. | 280/272 |

* cited by examiner

*Primary Examiner*—Lesley D. Morris
*Assistant Examiner*—Matthew Luby

(57) ABSTRACT

A dual purpose competition stunt bicycle steering brake and stabilizing system consists of a disk brake on the steering shaft which allows unlimited 360 degrees rotation of the steering wheel and allows the rider to start, stop or change direction of the relative rotation of the frame of the bicycle to the wheel. Also the rider can add as much steering resistance as desired for greater steering stabilization.

8 Claims, 3 Drawing Sheets

BICYCLE STEERING DISK BRAKE AND STABILIZER

This invention is a steering brake and stabilizer for bicycles and tricycles, powered or manually propelled, having a handle bar operated front wheel capable of 360 degrees rotation.

BACKGROUND OF THIS INVENTION

Cycles with front wheels capable of 360-degrees of rotation are used for sport and in many types of competition. Currently these cycles have no means of controlling and stopping the steering rotation other than by the handle bar. There has been a need for a device that will lock the steering and the bicycle frame into one rigid unit. Such a device would greatly aide in maneuverability for performing stunts and could also be used to stabilize the steering.

THIS INVENTION

The present invention is a controlled disk or rotor steering brake and stabilizer attached to a bicycle or tricycle having a steering wheel capable of 360-degrees rotation.

More particularly, in a competition stunt bicycle having a steering assembly (handle bar, shaft and wheel) capable of 360-degrees rotation, the present invention is a steering brake device comprising a rotor secured perpendicularly to and about the shaft and rotating therewith and a hand-operated cable-pull activating a brake on said rotor.

The rotor brake is preferably a caliper, but a wedge, drum or brand brake can also be used. The cable-pull preferably operates through a conventional gyro cable-pull so that the steering shaft can rotate freely. While a cable-pull is much preferred, the rotor brake can be activated hydraulically or electrically.

Objects of the 360 degrees controlled cycle steering brake and stabilizer of this invention are:

(a) to provide added stability by giving the rider the ability to start, stop and change the direction of rotation of the wheel relative to the bicycle frame. For example, this invention permits a "tail whip" maneuver in which the bicycle frame rotates completely around the handle bars which are held in a fixed position by the rider with the rotation then being abruptly stopped;

(b) to give the rider more confidence and encourage the rider to undertake a wider range of new stunts;

(c) to allow the rider to perform stunts with less physical exertion;

(d) in off-road downhill riding to offer the rider adjustable steering resistance for added control in steering dampening and stabilization in steep or rugged terrain.

THE DRAWINGS

DESCRIPTION

Figure 1:
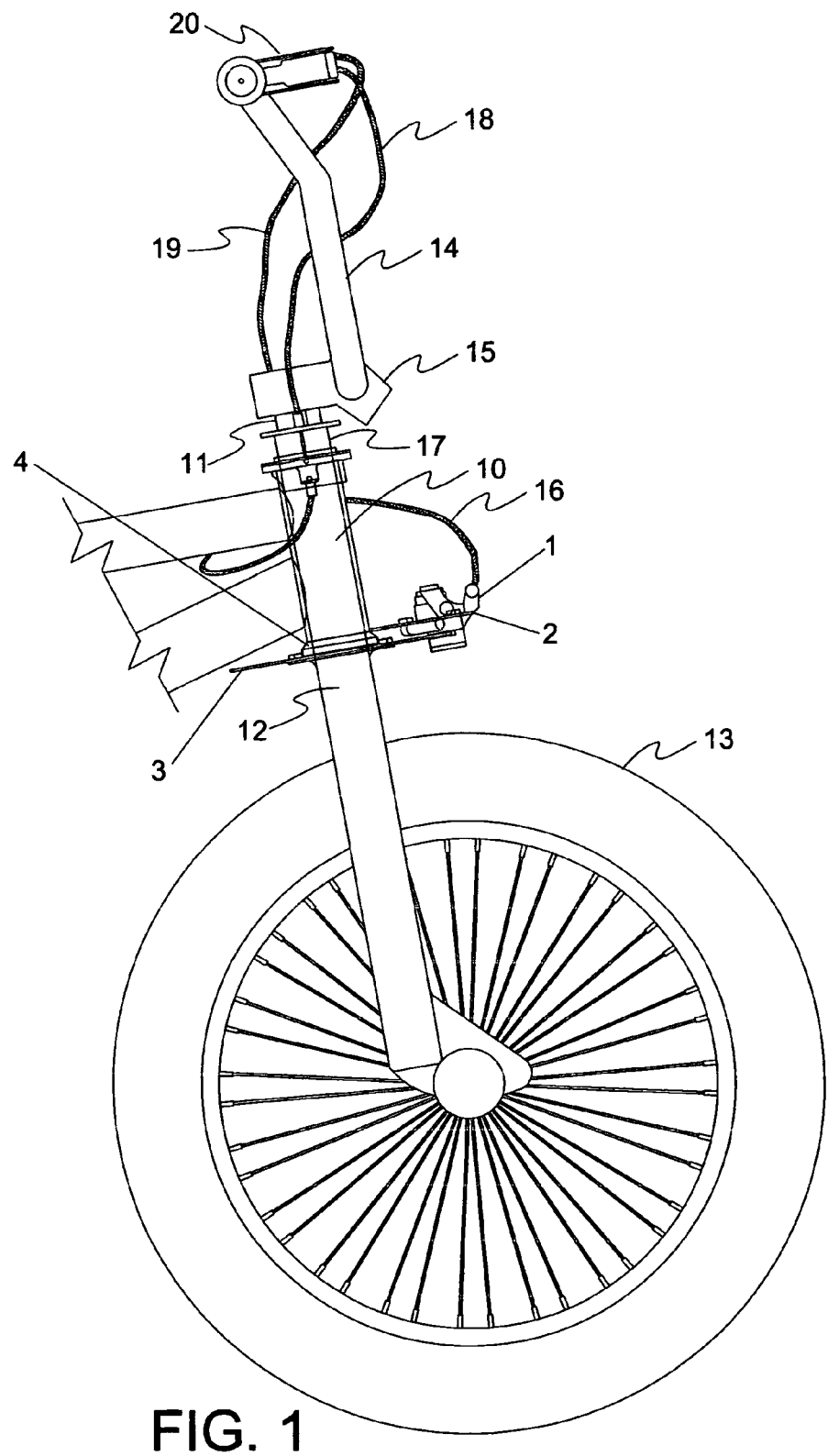
FIG. 1 is an elevation view of the front or steering wheel of a cycle having the device of this invention mounted thereon.
Figure 2:
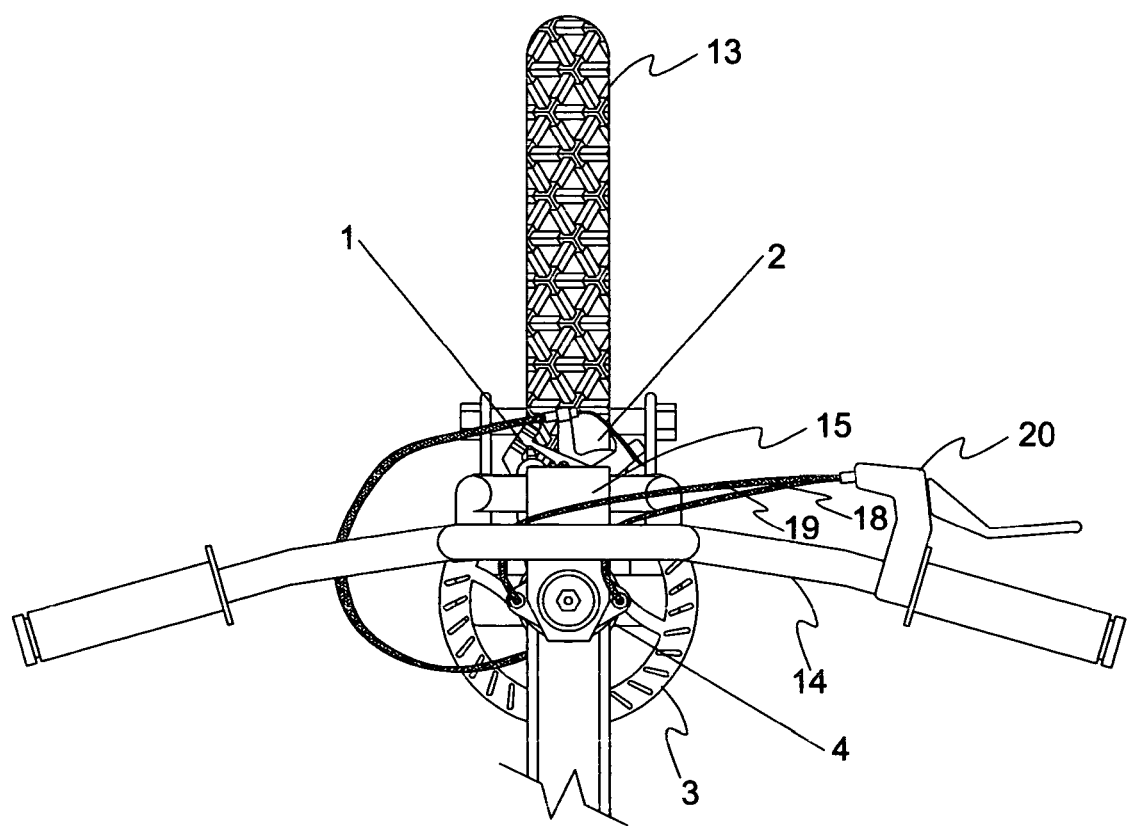
FIG. 2 is a plan view of the steering wheel of FIG. 1.
Figure 3:
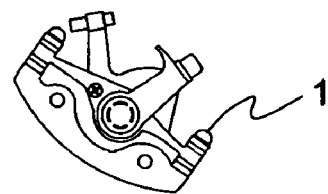
FIG. 3 shows the brake caliper as used in this invention.
Figure 4:
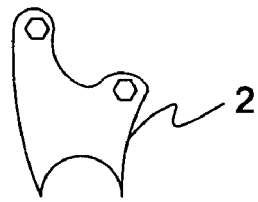
FIG. 4 shows the brake caliper mounting bracket.
Figure 5:
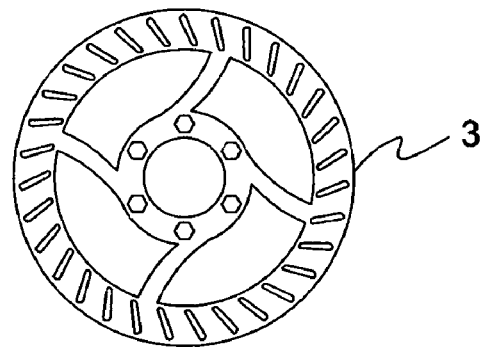
FIG. 5 illustrates the brake rotor.
Figure 6:
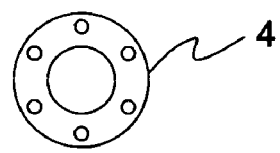
FIG. 6 shows the brake rotor mounting bracket.
Figure 7:
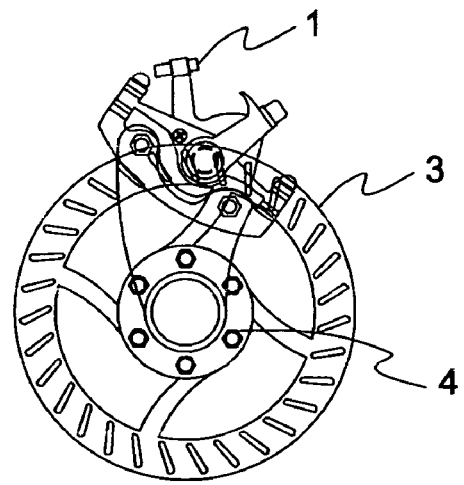
FIG. 7 is an assembled view of the steering brake (not mounted on the steering wheel).

Illustrated in the drawings is the front portion of a cycle frame or tube (10) holding a steering shaft (11) attached to forks (12) holding wheel (13). A handle bar (14) is affixed to the top of the shaft by bracket (15). All of this is conventional and known.

In accordance with this invention, a brake rotor (3) is attached perpendicularly about shaft (11) below tube (10) by rotor mounting bracket (4). A brake caliper (1) is held on frame (10) by a mounting bracket (2) welded to the frame. Caliper (1) is shown positioned to engage rotor (3). The caliper is activated by cable (16) attached to a gyro cable-pull (17), which in turn is activated by two cables (18) and (19) operated by hand lever (20) on handle bar (14).

Both the rotor (3) and caliper (1) illustrated are readily available bicycle wheel braking components and were repositioned or shown in the drawings to prepare an operating model of this invention. Also, the gyro cable-pull (17) is a standard commercially available item normally used to operate brakes on bicycles.

The 360 degrees controlled disk steering in brake and stabilizer is simple to operate. All a rider has to do is squeeze the bicycle steering brake lever (20). The harder the steering brake lever (20) is pulled the greater the resistance via caliper (1) will be felt in the bicycle steering. This resistance gives adjustable steering dampening up to the point where the rotation is frozen.

The controlled disk steering brake and stabilizer of this invention is adaptable to motorcycles, mountain bikes, dirt bikes for free-style competition, drag bikes for maintaining control in straight-line on deceleration, 4-wheelers (quads), snowmobiles, scooters, or any steer-able vehicle operating through a shaft holding the wheel requiring steering dampening or freezing.

What is claimed is:

1. In a cycle having a steering assembly secured on a frame with a shaft to and controlling a rotation of a wheel, the improvement comprising a rotor secured perpendicularly to and around said shaft and rotating therewith, and hand operating means for arresting the rotation of said rotor and thus of said wheel.

2. The improvement of claim 1 wherein said hand operated means is selected from the group consisting of wedges, drums, bands and calipers activated by activation means selected from the group consisting of electric, hydraulic and cable activators.

3. The improvement of claim 1 wherein said cycle has a handle bar attached to said shaft and rotating therewith, wherein said shaft is capable of 360 degrees rotation, and wherein said hand operated means for arresting the rotation of said rotor comprises a caliper fixed to said frame and adapted to grip said rotor when activated, a handle bar cable connected to said caliper, and a hand operated lever connected to said handle bar cable, and adapted to activate said caliper when said hand operated lever is squeezed.

4. The improvement of claim 3 further comprising a gyro cable pull attached about said shaft, wherein said gyro cable pull is in communication with said caliper, said handle bar cable and said hand operated lever.

5. A controlled disk steering brake stabilizer attached to a bicycle having a steering assembly secured on a frame with a shaft to and controlling a rotation of a wheel, wherein the wheel of the bicycle is capable of 360 degrees rotation, and wherein said controlled disk steering brake stabilizer comprises:

a rotor secured perpendicularly to and around said shaft and rotating therewith; and hand operating means for arresting the rotation of said rotor and thus of said wheel.

6. The controlled disk steering brake stabilizer of claim 5 wherein said hand operated means is selected from the group consisting of wedges, drums, bands and calipers activated by activation means selected from the group consisting of electric, hydraulic and cable activators.

7. The controlled disk steering brake stabilizer of claim 5 wherein said cycle has a handle bar attached to said shaft and rotating therewith, wherein said hand operated means for arresting the rotation of said rotor-comprises a caliper attached to the frame and adapted to grip said rotor when activated, a handle bar cable connected to said caliper, and a hand operated lever dimensioned for connection to said handle bar cable and adapted to activate said caliper when said hand operated lever is squeezed.

8. The controlled disk steering brake stabilizer of claim 7 further comprising a gyro cable pull dimensioned for attachment to about the shaft, wherein said gyro cable pull is communicates with said caliper, said handle bar cable and said hand operated lever such that said caliper is activated when said hand operated lever is squeezed and such that said handle bar cable does not become tangled when the wheel of the bicycle is rotated 360 degrees.

* * * * *